United States Patent [19]
Flaum et al.

[11] Patent Number: 6,140,817
[45] Date of Patent: Oct. 31, 2000

[54] MAGNETIC RESONANCE WELL LOGGING METHOD AND APPARATUS

[75] Inventors: Charles Flaum; Robert L. Kleinberg, both of Ridgefield, Conn.

[73] Assignee: Schlumberger Technology Corporation, Ridgefield, Conn.

[21] Appl. No.: 09/085,274

[22] Filed: May 26, 1998

[51] Int. Cl.$^7$ .................................................. G01V 3/00
[52] U.S. Cl. ........................................... 324/303; 324/300
[58] Field of Search ..................................... 324/303, 300, 324/301, 302, 304

[56] References Cited

U.S. PATENT DOCUMENTS

| | | | |
|---|---|---|---|
| 5,023,551 | 6/1991 | Kleinberg et al. | 324/303 |
| 5,055,787 | 10/1991 | Kleinberg et al. | 324/303 |
| 5,153,514 | 10/1992 | Griffin et al. | 324/303 |
| 5,291,137 | 3/1994 | Freedman | 324/303 |
| 5,486,762 | 1/1996 | Freedman et al. | 324/303 |
| 5,557,200 | 9/1996 | Coats | 324/303 |

FOREIGN PATENT DOCUMENTS

| | | | |
|---|---|---|---|
| 2 336 912 | 11/1999 | United Kingdom | G01V 3/32 |
| WO 9535514A1 | 6/1995 | WIPO | G01V 3/08 |
| WO 98/19183 | 5/1998 | WIPO | G01V 3/00 |

OTHER PUBLICATIONS

Meiboom, S., Gill, D., 1958, "Modified Spin Echo Method for Measuring Nuclear Relaxation Times", Review of Scientific Instruments, 29, 688–691.

Sezginer, A., Kleinberg, R.L., Fukuhara, M., Latour, L.L., 1991, "Very Rapid Simultaneuous Measurement of Nuclear Magnetic Resonance Spin–Lattice Relaxation Time and Spin–Spin Relaxation Time", Journal of Magnetic Resonance 92, 504–527.

Kleinberg, R.L. Vinegar, H.J., 1996, "NMR Properties of Reservoir Fluids", Log Analyst Nov.–Dec. 1996. p. 20–32.

Morriss, C.E., Deutch, P., Freedman, R., McKeon, D., Kleinberg, R.L., 1996., "Operating Guide for the Combinable Magnetic Resonance Tool", Log Analyst, Nov.–Dec. 1996, p. 53–60.

Straley, C., Rossini, D, Vinegar, H., Tutunjian, P., Morriss, C., 1997, "Core Analysis by Low Field NMR", Log Analyst, Mar.–Apr. 1997, p. 84–94.

Kleinberg, R.L., Straley, C., Kenyon, W.E., Akkurt, R., Farooqui, S.A., 1993, "Nuclear Magnetic Resonance of Rocks: $T_1$ vs. $T_2$", Society of Petroleum Engineers Papers 26470.

Straley, C., Morriss, C.E., Kenyon, W.E., Howard, J.J., 1995, "NMR in Partially Saturated Rocks", Log Analyst, Jan.–Feb. 1995, p. 40–56.

Singer, J.M., Johnston, L., Kleinberg, R.L., Flaum, C., 1997, "Fast NMR Logging for Bound Fluid and Permeability", SPWLA 38th Annual Logging Symposium, Paper YY.

(List continued on next page.)

Primary Examiner—Christine K. Oda
Assistant Examiner—Brij B. Shrivastav
Attorney, Agent, or Firm—William B. Batzer; Martin M. Novack

[57] ABSTRACT

Technique and apparatus are disclosed for identifying characteristics of hydrocarbons, such as distinguishing light and heavy formation oil, in formations surrounding an earth borehole. The technique and apparatus can also be used for determining residual oil saturation, permeability, and bound water volume. An embodiment of the method of the invention includes the following steps: providing a nuclear magnetic resonance logging device that is moveable through the borehole; providing, from the logging device, a polarizing magnetic field and cycles of a magnetic pulse sequence, and receiving magnetic resonance spin echoes from the formations; processing the received spin echoes to produce a $T_2$ distribution; computing a magnetic resonance porosity from the $T_2$ distribution; deriving a measure of total porosity of the formations; and comparing the magnetic resonance porosity with the total porosity.

32 Claims, 13 Drawing Sheets

OTHER PUBLICATIONS

Prammer, M.G., Drack, E.D., Bouton, J.C., Gardner, J.S., 1996, "Measurements of Clay Bound Water and Total Porosity by Magnetic Resonance Logging", Long Analyst, Nov.–Dec. 1996, p. 61–69.

Freedman, R., Boyd, A., Gubelin, G., McKeon, D., Morriss, C.E., Flaum C., 1997, "Measurement of Total NMR Porosity Adds New Value to NMR Logging", SPWLA 38th Annual Logging Symposium, Paper OO.

Kenyon, B., Kleinberg, R., Straley, C., Gubelin, G., Morriss, C., 1995, "Nuclear Magnetic Resonance—Technology for the 21st Century", Schlumberger Oilfield Review, Autumn 1995, p. 19–33.

White, J., 1997, "Applications of Downhole Magnetic Resonance Imaging in the North Sea", Society of Petroleum Engineers Offshore Europe Conference Paper 38551.

Murphy, D.P., 1995, "NMR Logging and Core Analysis Simplified", World Oil, Apr. 1995, p. 65–70.

Freedman, R., Morriss, C.E., 1995, "Processing of Data from an NMR Logging Tool", Society of Petroleum Engineers Paper 30560.

Coates, G.R., Marschall, D., Mardon, D., Galford, J., 1997, "A New Characterization of Bulk Volume Irreducible Using Magnetic Resonance", SPWLA 38th Annual Logging Symposium, Paper QQ.

Kleinberg, R.L., Boyd, A., 1997, "Tapered Cutoffs for Magnetic Resonance Bound Water Volume", Society of Petroleum Engineers Paper 38737.

Herron, M.M., 1987, "Estimating the Intrinsic Permeability of Clastic Sediments from Geochemical Data", SPWLA 28th Annual Logging Symposium, Paper HH.

| CMR POROSITY | 0.3 (ft3/ft3) 0 | 0.3 (ms) 3000 | T2 DISTRIBUTION |

WATER VOLUME (FROM AT90) | 0.3 (ft3/ft3) 0

NUCLEAR POROSITY | 0.3 (ft3/ft3) 0

CMR BOUND FLUID | 0.3 (ft3/ft3) 0

CORE POROSITY | 30 0

CMR PHI DEFICIT

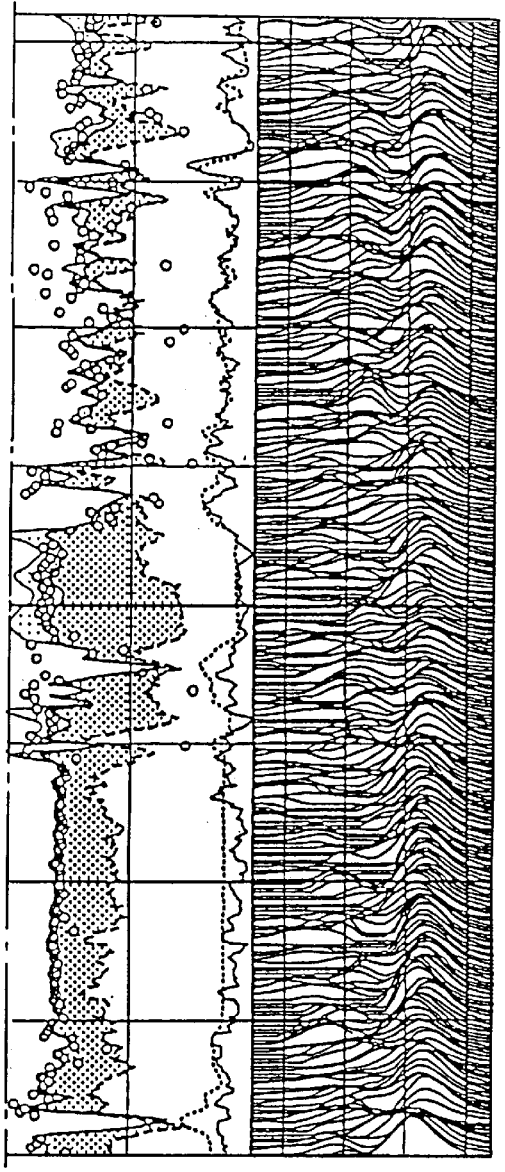
FIG.10B-2
| CMR POROSITY | 0.3 (ft3/ft3) 0 | 0.3 (ms) 3000 | T2 DISTRIBUTION |
WATER VOLUME (FROM AT90)   0.3 (ft3/ft3) 0
NUCLEAR POROSITY   0.3 (ft3/ft3) 0
CMR BOUND FLUID   0.3 (ft3/ft3) 0
CORE POROSITY   30   0
CMR PHI DEFICIT   
GAS INDICATION   

MAGNETIC RESONANCE WELL LOGGING METHOD AND APPARATUS

FIELD OF THE INVENTION

This invention relates to apparatus and techniques for determining characteristics of earth formations surrounding a borehole and, more particularly, to a method and apparatus for nuclear magnetic resonance borehole logging to determine characteristics including one or more of the following: the nature of formation hydrocarbons, residual oil saturation, permeability, and bound water volume. The invention also relates to MR logging with improved logging speed.

BACKGROUND OF THE INVENTION

General background of nuclear magnetic resonance well logging [also called magnetic resonance (MR) logging] is set forth in copending U.S. patent application Ser. No. 08/873,582, assigned to the assignee hereof, and in U.S. Pat. No. 5,023,551. Briefly, in nuclear magnetic resonance operation, the spins of nuclei align themselves along an externally applied static magnetic field. This equilibrium situation can be disturbed by a pulse of an oscillating magnetic field (e.g. an RF pulse), which tips the spins away from the static field direction. After tipping, two things occur simultaneously. First, the spins precess around the static field at the Larmor frequency, given by $\omega_0 = \gamma B_0$, where $B_0$ is the strength of the static field and $\gamma$ is the gyromagnetic ratio. Second, the spins return to the equilibrium direction according to a decay time T1, the spin lattice relaxation time. For hydrogen nuclei, $\gamma/2\pi = 4258$ Hz/Gauss, so, for example, for a static field of 235 Gauss, the frequency of precession would be 1 MHz. Also associated with the spin of molecular nuclei is a second relaxation, T2, called the spin-spin relaxation time. At the end of a ninety degree tipping pulse, all the spins are pointed in a common direction perpendicular to the static field, and they all precess near the Larmor frequency. However, because of molecular interactions, each nuclear spin precesses at a slightly different rate. T2 is a time constant of this "dephasing".

A widely used technique for acquiring NMR data both in the laboratory and in well logging, uses an RF pulse sequence known as the CPMG (Carr-Purcell-Meiboom-Gill) sequence. [See Meiboom, S., Gill, D., 1958, "Modified Spin Echo Method for Measuring Nuclear Relaxation Times", Review of Scientific Instruments, 29, 688–691]. As is well known, after a wait time that precedes each pulse sequence, a ninety degree pulse causes the spins to start precessing. Then a one hundred eighty degree pulse is applied to keep the spins in the measurement plane, but to cause the spins which are dephasing in the transverse plane to refocus. By repeatedly reversing the spins using one hundred eighty degree pulses, a series of "spin echoes" appear, and the train of echoes is measured and processed, for example to obtain a $T_2$ distribution of fluid components of the formations.

Magnetic resonance logging has added a new dimension to formation evaluation. The MR measurement is sensitive to total fluid content, to the intrinsic properties of the fluids, and to the environments in which the fluids reside in the pore space of porous rock. There are many applications of magnetic resonance tools, and among the most common and important are the determination of capillary and clay bound water volumes and the estimation of permeability. Bound water analysis is of central interest to the log interpreter because it helps predict the potential water cut of a formation volume, and is a major factor in the perforation decision. A continuous permeability log can provide an estimation of potential production rate and also indicates flow barriers and thief zones. These log outputs are difficult to obtain reliably with other logging tools, and hence may be termed "MR-unique".

One limitation of MR tools is their slow logging speed. Magnetic resonance logging uses a cyclic measurement consisting of a wait time followed by an echo acquisition period. Conventional MR data are presently acquired with wait times sufficiently long to substantially polarize all fluid protons in the formation. Protons in gas, light oil, oil base mud filtrates, and vug water polarize very slowly. Therefore, very long wait times have been used when logging formations in which those fluids are present. The long wait times necessarily contribute to slow logging speeds. Thus, while MR tools provide important additional information, it can be at the cost of wellsite efficiency.

Precision of MR logging outputs (e.g. porosity) can be enhanced by increasing the stacking of the data. In conventional practice, this requires either degrading the vertical resolution, or logging more slowly to collect more data within a given depth interval.

Heretofore it has been considered difficult or impossible to estimate residual oil saturation in wells drilled with oil base mud. This is particularly true when the native oil has a low downhole viscosity, which renders it difficult or impossible to distinguish native fluids from invaded fluids on the basis of existing magnetic resonance $T_2$ measurements.

It is among the objects of the present invention to overcome limitations of prior art MR techniques by determining residual oil saturation and other formation characteristics in wells drilled with oil base mud. It is also among the objects of the invention to improve logging speed (e.g. for a given precision and/or vertical resolution) of MR logging. It is also among the objects of the invention to provide a technique for determining when formation permeability may be overestimated in certain types of formations.

SUMMARY OF THE INVENTION

Many well logging measurements are continuous. A source continuously illuminates the formation, which continuously returns a signal to the tool. Although data stacking may be used to improve precision, the measurement itself is effectively instantaneous. Induction tools and density tools are examples from this family. A second class of logging tools operate cyclically. A source in the tool emits a brief burst, and after a delay a time-resolved signal is received from the formation. Examples are sonic tools and pulsed neutron tools.

Magnetic resonance tools are extreme examples of cyclic tools: the measurement cycle is longer and more complicated than for any other logging tool. In a typical MR measurement cycle, and as referenced in the background portion hereof, permanent magnets within the tool polarize the hydrogen nuclei of formation fluids during a "wait time". Then, an antenna broadcasts a series of pulses of high frequency magnetic field. Return spin echoes from the formation are detected after the second and each subsequent pulse in a CPMG pulse sequence.

In a known type of MR logging device to be referenced hereinbelow, the wait-acquisition cycles are collected in phase alternated pairs (PAPs). A phase shift of the RF carrier of one pulse in the sequence reverses the sense of the CPMG acquisition [See Sezginer, A., Kleinberg, R. L., Fukuhara, M., Latour, L. L., 1991, "Very Rapid Simultaneous Measurement of Nuclear Magnetic Resonance Spin-Lattice Relaxation Time and Spin-Spin Relaxation Time", Journal of Magnetic Resonance 92, 504–527; U.S. Pat. No. 5,023, 551.] Taking the difference between the positive and negative CPMG's echo-by-echo doubles the size of the signal and eliminates baseline and several spin-dynamics errors.

The time T required for a phase alternated pair measurement cycle is $$T = 2 \times [W + (N \times TE)] \quad (1)$$

where W is the wait time during which the nuclei are polarized before pulsing begins, N is the number of echoes in the acquisition sequence, and TE is the spacing of the echoes. To acquire n phase alternated pairs every L feet, the logging speed V must be $$V = \frac{L}{nT} \quad (2)$$

In one example of operation of the referenced MR logging device in a sandstone logging mode, W=1.3 sec, N=600 echoes, TE=0.32×10$^{-3}$ sec, the depth frame is L=0.5 ft, and n=1 PAP per depth frame. In such case, T is about 3 seconds and V is about 600 ft/hr.

The sandstone logging mode is generally satisfactory when the formation hydrogen can be polarized during the 1.3 second wait time. Then the logging tool can provide a complete suite of MR measurements, including porosity, pore size distribution, and other useful log outputs. However, in some circumstances, the 1.3 second wait time is inadequate to fully polarize the formation. This is the case when formations have long longitudinal relaxation times, $T_1$. As noted in the background hereof, examples are reservoirs with light oil or gas, those drilled with oil base muds, or those with vugs. In such cases, $T_1$ is usually equal to its bulk fluid value, which can be several seconds. [See Kleinberg, R. L. Vinegar, H. J., 1996, "NMR Properties of Reservoir Fluids", Log Analyst November–December 1996. pg. 20–32.] The wait time must be several times longer than the longest formation $T_1$ to obtain complete information. This increases the cycle time, T. To maintain precision and vertical resolution, the logging speed must be reduced. See, for example, Morriss, C. E., Deutch, P., Freedman, R., McKeon, D., Kleinberg, R. L., 1996, "Operating Guide for the Combinable Magnetic Resonance Tool", Log Analyst, November–December 1996, pg. 53–60, which describes an MR tool operating in an oil base mud mode with a logging speed of 200 ft/hr.

Magnetic resonance logging tools are characterized by considerable flexibility in measurement modes. Measurement can be tailored to the objectives of the logging program. In an illustrated embodiment and examples hereof, wells drilled with oil base mud are considered. Neutron, density, resistivity and gamma ray tools can efficiently provide porosity, lithology, and deep saturation information. Permeability and precise values of bound water volume used for the determinations hereof are obtained by magnetic resonance logging. Rig time expense dictates the most rapid acquisition possible consistent with requirements of enhanced precision and good vertical resolution, and rapid acquisition is an advantageous feature of the invention.

As is well known, the volume of bound water at a given air-brine capillary pressure is associated with nuclear magnetic resonance signals that decay with a $T_2$ less than a formation-dependent $T_{2cutoff}$. In sandstones, for an air-brine capillary pressure of 100 psi (700 kPa), the $T_{2cutoff}$ is often about 33 msec, but can be higher or lower [see Straley, C., Rossini, D, Vinegar, H., Tutunjian, P., Morriss, C., 1997, "Core Analysis by Low Field NMR", Log Analyst, March–April 1997, pg. 84–94]. The $T_1$ associated with this part of the porosity is often about 1.5 times longer than $T_2$ [see Kleinberg, R. L., Straley, C., Kenyon, W. E., Akkurt, R., Farooqui, S. A., 1993, "Nuclear Magnetic Resonance of Rocks: $T_1$ vs. $T_2$", Society of Petroleum Engineers Papers 26470; Straley, C., Morriss, C. E., Kenyon, W. E., Howard, J. J., 1995, "NMR in Partially Saturated Rocks", Log Analyst, January–February 1995, pg. 40–56]. A reduced wait time, of duration a few times longer than longest $T_1$ of the bound fluid, will completely polarize the bound water in the formation. Note also that fewer echoes are needed to characterize relaxation time components shorter than $T_{2cutoff}$ than are required to characterize the entire $T_2$ distribution.

When the wait time is short, those formation fluids having long $T_1$'s are not completely polarized, i.e. they are not fully represented in the subsequent CPMG echo train. As is known in the art, for a fluid component characterized by $T_{1i}$, the apparent signal amplitude is given by $$A_i = A_{oi}\left(1 - \exp\left(-\frac{W}{T_{1i}}\right)\right) \quad (3)$$

where W is the wait time, $A_i$ is the signal strength (in porosity units) associated with a formation fluid i having polarization time $T_{1i}$, and $A_{0i}$ is the signal strength for that fluid in the limit W→∞. if W is not several times longer than $T_{1i}$, the signal strength $A_i$ is not representative of the volume of that fluid.

Laboratory measurements on water saturated rocks have shown that $T_1$ can be estimated by $T_1 = \xi T_2$, where $1 < \xi < 3$. Then, equation (3) can be written as $$A_i = A_{oi}\left(1 - \exp\left(-\frac{W}{\xi T_{2i}}\right)\right) \quad (4)$$

Conventional processing with the type of MR tool described herein automatically accounts for this factor. The result is functionally equivalent to correcting the $T_2$ distribution; that is $$P(T_{2i}) = \frac{P(T_{2i})_{uncorr}}{1 - \exp\left(-\frac{W}{\xi T_{2i}}\right)} \quad (5)$$

where $P(T_{2i})_{uncorr}$ is the uncorrected $T_2$ distribution and $P(T_{2i})$ is the displayed distribution. The default value, $\xi=1.5$, is appropriate for many water saturated rocks.

In the presence of light oil or oil base mud, when the $T_2$ distribution is distorted by the effects of reduced cycle time, the standard polarization correction is inappropriate. It is preferable to use equation (3) to recover the true amplitude of fluid components with long $T_1$'s. The polarization correction would then be $$P(T_{2i}) = \frac{P(T_{2i})_{uncorr}}{1 - \exp\left(-\frac{W}{T_1}\right)} \quad (6)$$

Note that a fixed value of $T_1$—that is, the longer relaxation time of the oil phase—is used in this equation. This correction should only be applied to that part of the $T_2$ distribution which represents the oil phase. The bound water (in water wet rock) has a very short relaxation time, and clearly the $T_1$ of the oil phase should not be applied to it. $T_1$ is not measured directly by MR tools, but in many cases it can be estimated from the bulk properties of the fluids at reservoir conditions [see Kleinberg, R. L. Vinegar, H. J., 1996, "NMR Properties of Reservoir Fluids", Log Analyst November––December 1996. pg. 20–32].

Cycle time can also be reduced by reducing the number of echoes acquired in each CPMG. A long acquisition time, N×TE, is required if good definition of long $T_2$ components is required. To obtain accurate values of bound water volume, it is only necessary to resolve components having $T_2$ less than $T_{2cutoff}$. For TE=0.32 msec, as few as 100 echoes are adequate to define the $T_2$ distribution below 30 msec.

Reducing the number of echoes has two beneficial effects on cycle time. First, there is a direct effect, as can be seen from Equation (1). Second, MR tools have power restrictions that prevent the wait time from being less than some multiple of the acquisition time. Thus, an excessive number of echoes can force the wait time to be longer.

In accordance with an embodiment of the invention, there is disclosed a method for identifying characteristics of hydrocarbons (e.g. distinguishing light and heavy formation oil) in formations surrounding an earth borehole, comprising the following steps: providing a nuclear magnetic resonance logging device that is moveable through the borehole; providing, from the logging device, a polarizing magnetic field and cycles of a magnetic pulse sequence, and receiving magnetic resonance spin echoes from the formations; processing the received spin echoes to produce a $T_2$ distribution; computing a magnetic resonance porosity from the $T_2$ distribution; deriving a measure of total porosity of the formations; and comparing the magnetic resonance porosity with the total porosity. Residual oil saturation can also be obtained as a function of the comparison.

In a preferred embodiment of the invention, the polarization wait time, W, of said cycles of magnetic pulse sequence is short enough to incompletely polarize the protons in an investigation region of the formations. In this embodiment, the wait time, W, is in the range 0.1 second to 1 second. Also in this embodiment, the step of comparing the magnetic resonance porosity with the total porosity comprises comparing the respective porosities in a water-bearing zone of the formations and comparing the respective porosities in an oil-bearing zone of the formations. In a form of the preferred embodiment, the following steps are also performed: developing a free/bound fluid cutoff of the $T_2$ distribution and applying a polarization correction to the free fluid components of the $T_2$ distribution before computing the magnetic resonance porosity from the $T_2$ distribution. In this form of the preferred embodiment, the step of comparing the magnetic resonance porosity with the total porosity comprises comparing the respective porosities in a water-bearing zone of the formations and comparing the respective porosities in an oil-bearing zone of the formations.

Further features and advantages of the invention will become more readily apparent from the following detailed description when taken in conjunction with the accompanying drawings.

DETAILED DESCRIPTION

Figure 1:
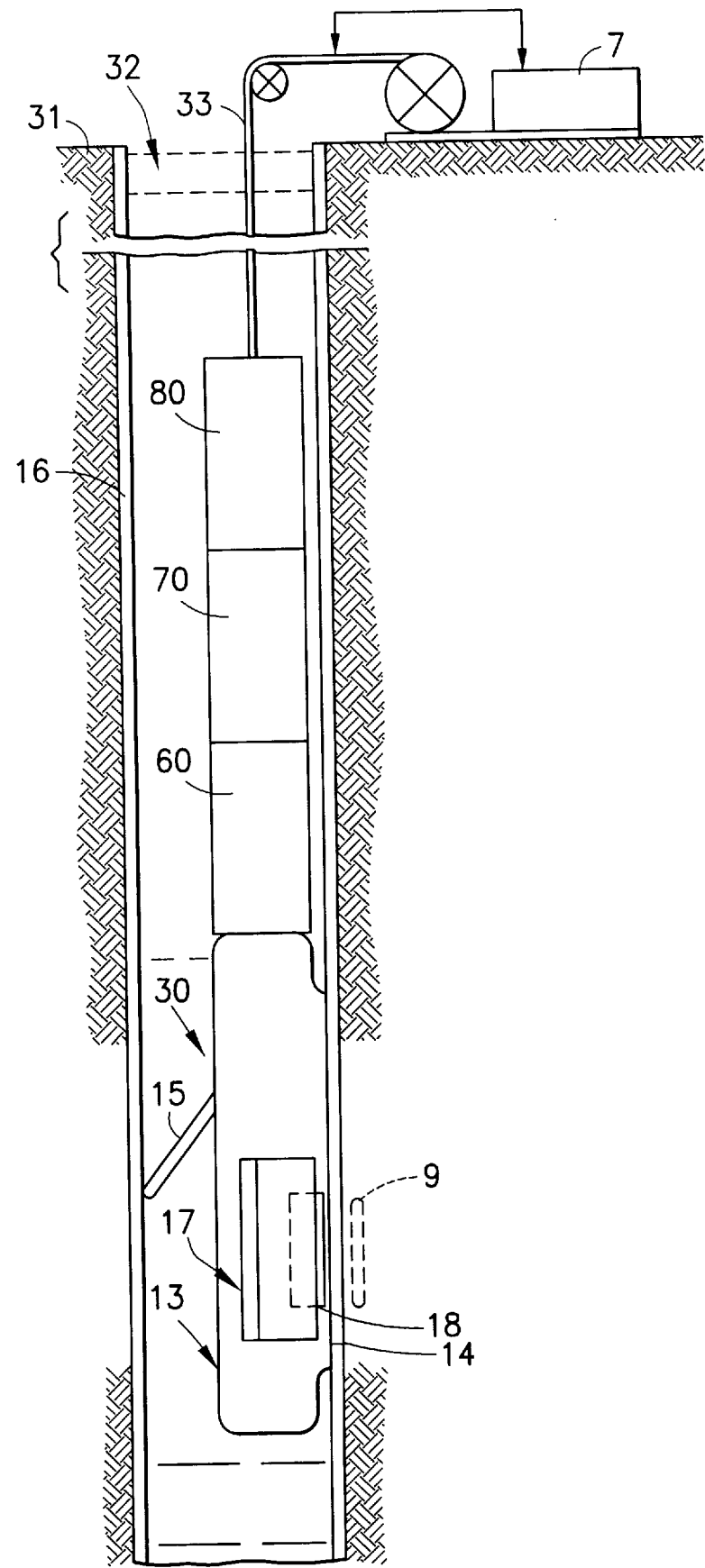
FIG. 1 is a diagram, partially in block form, of a well logging apparatus which can be used in practicing embodiments of the invention.

Referring to FIG. 1, there is shown an apparatus for investigating subsurface formations 31 traversed by a borehole 32, which can be used in practicing embodiments of the invention. The borehole 32 is typically filled with a drilling fluid or mud which contains finely divided solids in suspension, and mudcake 16 is shown on the walls of the borehole. The invention has particularly advantageous application when the mud is oil base mud.

A magnetic resonance investigating apparatus or logging device 30 is suspended in the borehole 32 on an armored cable 33, the length of which substantially determines the relative depth of the device 30. Also shown in FIG. 1 as part of the logging string are further logging devices represented by reference numerals 60, 70, and 80. In the present embodiment the device 60 represents a density and/or neutron logging device (although it may alternatively be a sonic device or other logging device for obtaining total porosity), the device 70 is a resistivity logging device, and the device 80 is a gamma ray logging device. It will be understood that measurements from these and/or other logging devices can, if desired, be obtained from separate logging runs with these and/or other logging devices or from other sources. The length of cable 33 is controlled by suitable means at the surface such as a drum and winch mechanism (not shown). Surface equipment, represented at 7, can be of conventional type, and can include a processor subsystem and communicates with the all the downhole equipment. It will be understood that processing can be performed downhole and/or uphole, and that some of the processing may be performed at a remote location. Also, while a wireline is illustrated, alternative forms of physical support and communicating link can be used, for example in a measurement while drilling system. As described for example in the U.S. Pat. No. 5,055,787, the magnetic resonance logging device 30 has a face 14 shaped to intimately contact the borehole wall, with minimal gaps or standoff, and a retractable arm 15 which can be activated to press the body of the tool 13 against the borehole wall during a logging run, with the face 14 pressed against the wall's surface. Although the tool 13 is shown as a single body, the tool may alternatively comprise separate components such as a cartridge, sonde or skid, and the tool may be combinable with other logging tools.

Figure 3:
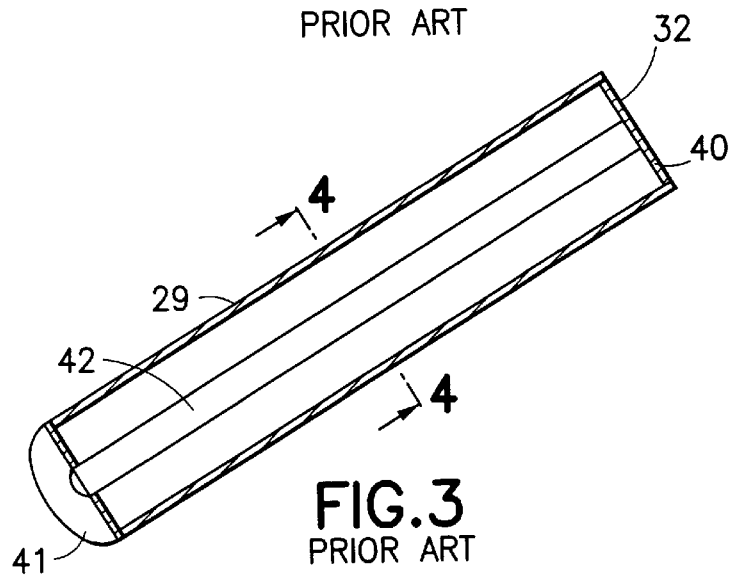
FIG. 3 is a perspective view of the RF antenna of the FIG. 1 nuclear magnetic resonance logging device.

The magnetic resonance logging device 30 includes a magnet array 17 and an RF antenna 18 positioned between the array 17 and the wall engaging face 14. Magnet array 17 produces a static magnetic field $B_0$ in regions surrounding the tool 13. The antenna 18 produces, at selected times, an oscillating magnetic field $B_1$ which is focussed into formation 12, and is superposed on the static field $B_0$ within those parts of formation opposite the face 14. The "volume of investigation" of the tool, shown in dotted lines in FIG. 3, is a vertically elongated region directly in front of tool face 14. As described in the referenced Patent, the tool 13 can make measurements by magnetically tipping the nuclear spins of particles in formation 12 with a pulse of oscillating field $B_1$, and then detecting the precession of the tipped particles in the static field $B_0$ within the volume of investigation over a period of time. Reference can also be made to Morriss, C. E., Deutch, P., Freedman, R., McKeon, D., Kleinberg, R. L., 1996, "Operating Guide for the Combinable Magnetic Resonance Tool", Log Analyst, November–December 1996, pg. 53–60.

Figure 2:
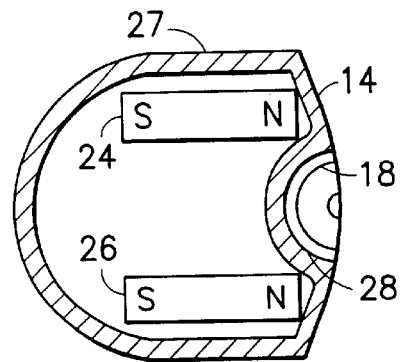
FIG. 2 is a cross-sectional diagram of a portion of the nuclear magnetic resonance logging device of FIG. 1.

FIG. 2 shows a magnet array 17 of the type disclosed in an embodiment of the referenced '787 Patent. The magnet array includes two permanent magnets 24 and 26, which are mounted generally parallel to each other within a metal alloy body 27. The body 27 should be of a material having low magnetic permeability, so as to not interfere with the static magnetic field. Magnets 24 and 26 are slabs which are elongated in the longitudinal direction of the borehole. The magnetic poles of each magnet are not on the smallest faces of the slab, commonly viewed as the ends of a bar magnet. Instead, the poles appear on the two opposing edges of the slab magnet and point to the left and right, respectively, in the Figure. Therefore, within the formation 12, the magnetic field $B_0$ surrounding the magnets remains fairly constant along the longitudinal direction of the borehole axis. In the illustration of FIG. 2, magnets 24, 26 are symmetrically mounted in the two sides of the body 27 with the north poles facing the same direction, that is, the direction of the face 14 of the tool. One or more further permanent magnets can be used.

Figure 4:
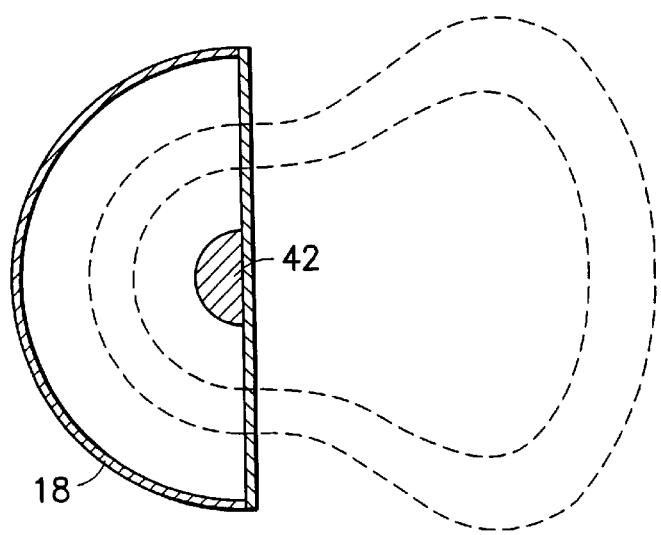
FIG. 4 is a cross-sectional view of the RF antenna of FIG. 3, as taken through a section defined by the arrows 4—4 in FIG. 3.

As described in the referenced '787 Patent, the metal body 27 has, on the front face 14 thereof, a semi-cylindrically shaped cavity or slot 28 which faces formations engaged by the face 14. The cavity 28 is adapted for receiving an RF antenna 18 that is shown in FIG. 3–4. The antenna 18 is positioned outside of the metal body 27 (FIG. 2) of the tool, and is thereby shielded from electromagnetic communication with regions of the borehole which lie behind the body 27, or regions of other formations in directions intercepted by the body 27. Antenna 18 is thus responsive only to magnetic fields originating in front of the wall engaging face 14, e.g. fields originating in the formation 12 or in the mudcake or mud which contacts face 14 in the vicinity of the antennas 18. In a disclosed embodiment of the referenced Patent, the body 27 is made of metal alloy sheathing, rigidly attached to interior metal bracing, which envelops most components of the tool other than the antenna 18, including the circuitry, the magnet array 17, and the hydraulics system of the arm 15. The Patent points out that the body 27 can alternatively be constructed of other materials, so long as the overall structure is sufficiently strong and the magnetic field of the magnet array 17 can penetrate the body and enter the adjoining formation 12.

In the referenced '787 Patent, the antenna 18 is used both as an RF transmitter to produce an oscillating magnetic field in the formations, and as a receiving antenna to detect coherent magnetic signals emanating from precessing protons (spins) after the oscillating field is terminated. The antenna, which has a body 29 and an elongated center probe 42, across which signals are applied and detected, serves effectively as a current loop which produces an oscillating magnetic field $B_1$ (see FIG. 4) within the volume of investigation that is perpendicular to the static magnetic field, $B_0$ (which is radial in the volume of investigation). The body 29 is trough-shaped and has end plates 40, 41 with the center conductor or probe 42 extending from one end plate 40 to the other end plate 41, parallel to and centered in the semi-cylindrical trough 29. The U.S. Pat. No. 5,153,514 discloses that the trough antenna, which can be filled with a ferrite, can have an inner conductive shell that is separated from a steel body by a rubber layer, which suppresses magnetoacoustic ringing. It will be understood that various other types of magnetic resonance logging equipment can be used in practicing the invention.

Figure 5:
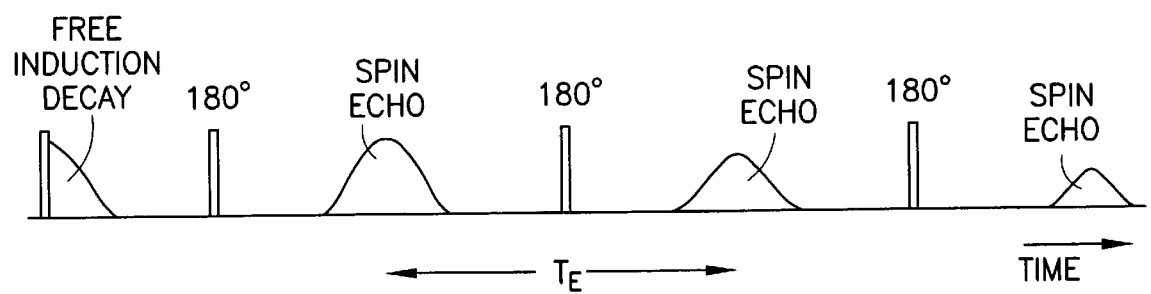
FIG. 5 is a diagram illustrating a conventional type of CPMG pulse sequence.

In an example of an embodiment hereof, the pulse sequence used can be a conventional type of Carr Purcell or CPMG sequence as illustrated in FIG. 5 (but with appropriate wait time and $T_E$ time). However, it will be understood that any other suitable type of pulse sequence can be used, consistent with the principles hereof.

Figure 6:
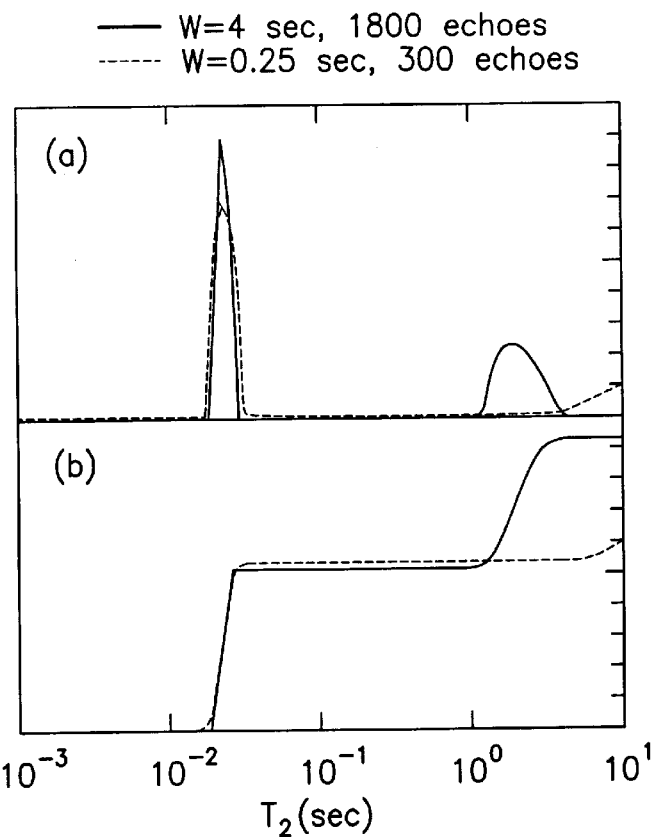
FIG. 6 shows $T_2$ distributions [graph (a)] and cumulatives of $T_2$ distributions [graph (b)] for laboratory NMR measurements on a mixture of hexane and nickel chloride for different wait times.

To illustrate the effect of cycle time reduction, roughly equal amounts of hexane ($T_1 = T_2 = 1.80$ sec) and water doped with NiCl ($T_1 = T_2 = 0.022$ sec) were placed together in a sample tube and nuclear magnetic resonance measurements performed. The results are shown in FIG. 6. Run #1 (solid line) used wait=4 sec and 1800 echoes, Run #2 (dotted line) used wait=0.25 sec and 300 echoes. Graph (a) shows $T_2$ distributions and graph (b) shows cumulatives of the distributions. No polarization correction was applied. The $T_2$ distribution found from the long cycle time measurement shows two distinct peaks corresponding to water and hexane. The short cycle time measurement underestimates the quantity of long-relaxation-time fluid while capturing all the information associated with short relaxation time fluid. The $T_2$ distribution for the hexane (like an oil signal) is considerably distorted when only 300 echoes are collected, as this number of echoes is not sufficient to define the details at the long-$T_2$ end of distribution. The standard polarization correction of Equation (5) can yield erroneous results unless artificial values of ξ are used. Instead, the fixed $T_1$ correction of Equation (6) should be applied to the long-$T_2$ part of the relaxation time distribution.

On a local basis, permeability sometimes correlates with porosity. In general, however, permeability depends on rock fabric, which can be independent of porosity. Magnetic resonance is an accepted method of probing rock microgeometry, and a number of permeability relations based on magnetic resonance have been found useful as follows [see Morriss, C. E., Deutch, P., Freedman, R., McKeon, D. Kleinberg, R. L., 1996, "Operating Guide for the Combinable Magnetic Resonance Tool", Log Analyst, November–December 1996, pg. 53–60]:

$$k = a\phi^4 T^2_{2,log} \tag{7}$$

$$k = a'\phi^4 \left(\frac{FFI}{BFV}\right)^2 \tag{8}$$

The constants a and a' are formation dependent, with default values a=4 mD/msec$^2$ and a'=10$^4$ mD. The use of Equation (7) calls for a porosity measurement and computation of the logarithmic mean of the entire $T_2$ distribution, while the use of Equation (8) calls for measurements of porosity φ, bound fluid volume BFV, and free fluid volume FFI. Thus, both relationships ostensibly require the measurement of the full nuclear magnetic resonance $T_2$ distribution, necessitating a long measurement cycle time.

Permeability can also be estimated by Equation (8) from short cycle MR measurements, using FFI=φ−BFV, where the bound fluid volume is measured by magnetic resonance, and porosity is measured by other tool(s).

$$k = a' \phi^4 \left( \frac{\phi - BFV}{BFV} \right)^2 \qquad (9)$$

There is some ambiguity in exactly which porosity is to be used; this point having been discussed by Singer et al. [see Singer, J. M., Johnston, L., Kleinberg, R. L., Flaum, C., 1997, "Fast NMR Logging for Bound Fluid and Permeability", SPWLA 38th Annual Logging Symposium, Paper YY]. In the present embodiment, the porosity used is density porosity $\phi_D$, or, in the presence of gas, the neutron-density crossplot porosity $\phi_T$.

Recent advances in MR tools, measurement techniques, and signal processing [see e.g. Prammer, M. G., Drack, E. D., Bouton, J. C., Gardner, J. S., 1996, "Measurements of Clay Bound Water and Total Porosity by Magnetic Resonance Logging", Long Analyst, November–December 1996, pg. 61–69; Freedman, R., Boyd, A., Gubelin, G., McKeon, D., Morriss, C. E., Flaum C., 1997, "Measurement of Total NMR Porosity Adds New Value to NMR Logging", SPWLA 38th Annual Logging Symposium, Paper OO] have dramatically improved the measurement of bound fluid volumes. Now, fluids having $T_2$ relaxation times of 0.5 msec or lower are included in the bound fluid volume (BFV). With these improvements, MR porosity agrees with density porosity in most shale intervals. Since all shale porosity is bound fluid, it is usually found that $\phi_D$=BFV in shales. Thus, Equation (9) estimates zero permeability in typical shales.

Despite recent improvements in measuring porosity components with very short $T_2$, magnetic resonance measurements can still underestimate bound fluid volume. For example, it has been observed that some mature, dewatered shales have relaxation time components below 0.3 msec. Bitumen volumes are also considerably underestimated by MR measurements. Then $\phi_D$>BFV, even when there is no free fluid. Under these circumstances, Equation (9) will erroneously indicate the presence of substantial permeability.

In order to automatically detect formations in which permeability is likely to be overestimated, a Low BFV Flag can be computed as:

$$\text{Flag} = \frac{\phi_D - BFV}{FFI^{(-)} + \varepsilon} \qquad (10)$$

Here $FFI^{(-)}$ is the underestimated value of free fluid volume. FFI is underestimated in reduced cycle time logging because short wait times result in partial polarization of fluid components having $T_1$>W. ε is a small constant (typically 0.25 p.u.) which prevents the denominator from going to zero in tight zones and shales.

The flag is zero in tight zones and in typical shales. In these zones, no correction to the computed permeability is required. In most other formations; $\phi_D$−BFV~$FFI^{(-)}$, so the Flag is near unity, which is denoted "low"; no correction to the computed permeability is required. In dewatered shales and bitumen, φ−BFV>0 and $FFI^{(-)}$≈0, so the Flag is high. In these zones the permeability can be automatically set equal to an arbitrarily low value. A flow diagram for this processing is described in conjunction with FIG. 9 below.

Oils of different viscosities have different nuclear magnetic resonance relaxation times [see Kleinberg, R. L. Vinegar, H. J., 1996, "NMR Properties of Reservoir Fluids", Log Analyst November–December 1996. pg. 20–32]. $T_2$ distributions from the type of MR logging device described herein are routinely used to determine the viscosity, η, of oil in place, and to distinguish productive oil zones from heavy and immobile hydrocarbons, such as in tar mats. Moreover, oil-water contacts in wells drilled with water base mud can frequently be unambiguously identified using $T_2$ measurements [see White, J., 1997, "Applications of Downhole Magnetic Resonance Imaging in the North Sea", Society of Petroleum Engineers Offshore Europe Conference Paper 38551].

Finding the oil-water contact (OWC) poses a challenge to magnetic resonance well logging when the well is drilled with oil base mud and the formation oil is light. In the water leg, oil base mud (OBM) filtrate displaces movable water in the volume of investigation of the MR tool, while in the oil leg, the filtrate mixes with formation oil. Because the nuclear magnetic resonance $T_2$ is relatively insensitive to viscosity when η≦1 cP, the $T_2$ distribution often shows no change at the OWC.

Figures 11, 11A:
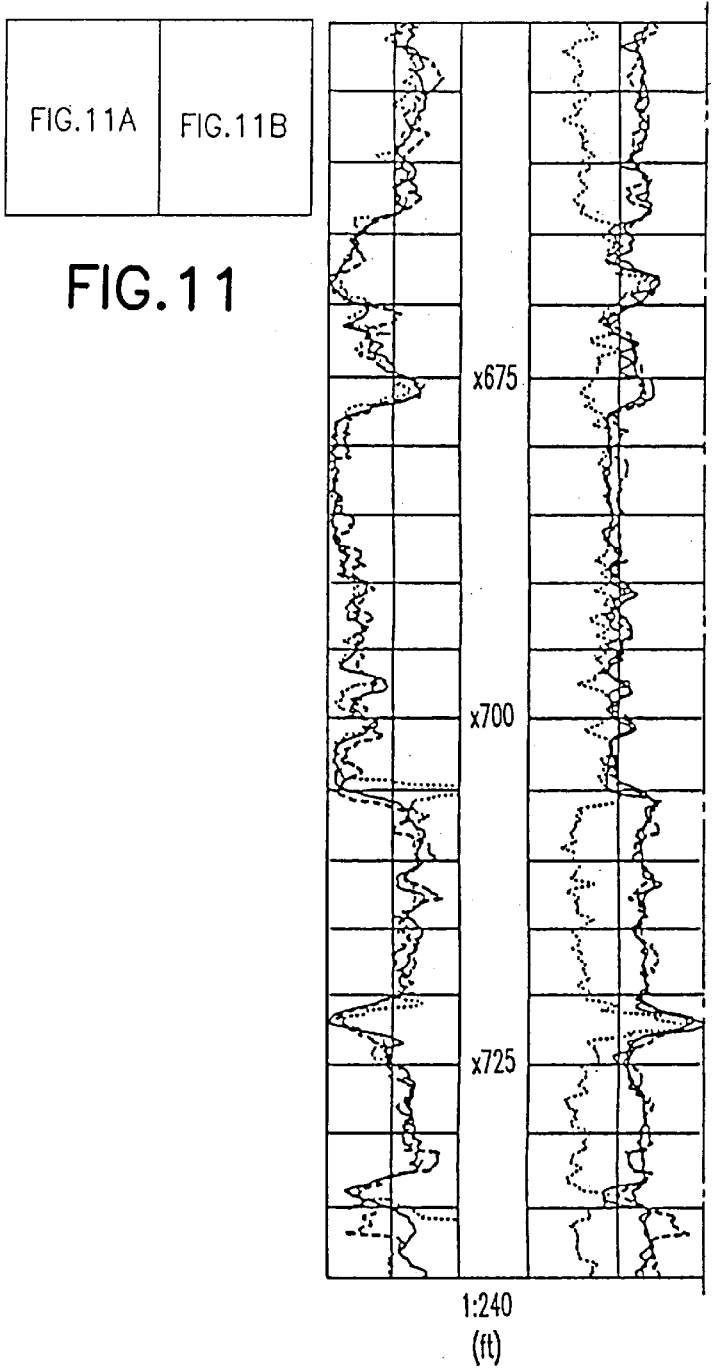
FIG. 11 shows logging tracks and computed tracks for a second log example.
Figure 11B:
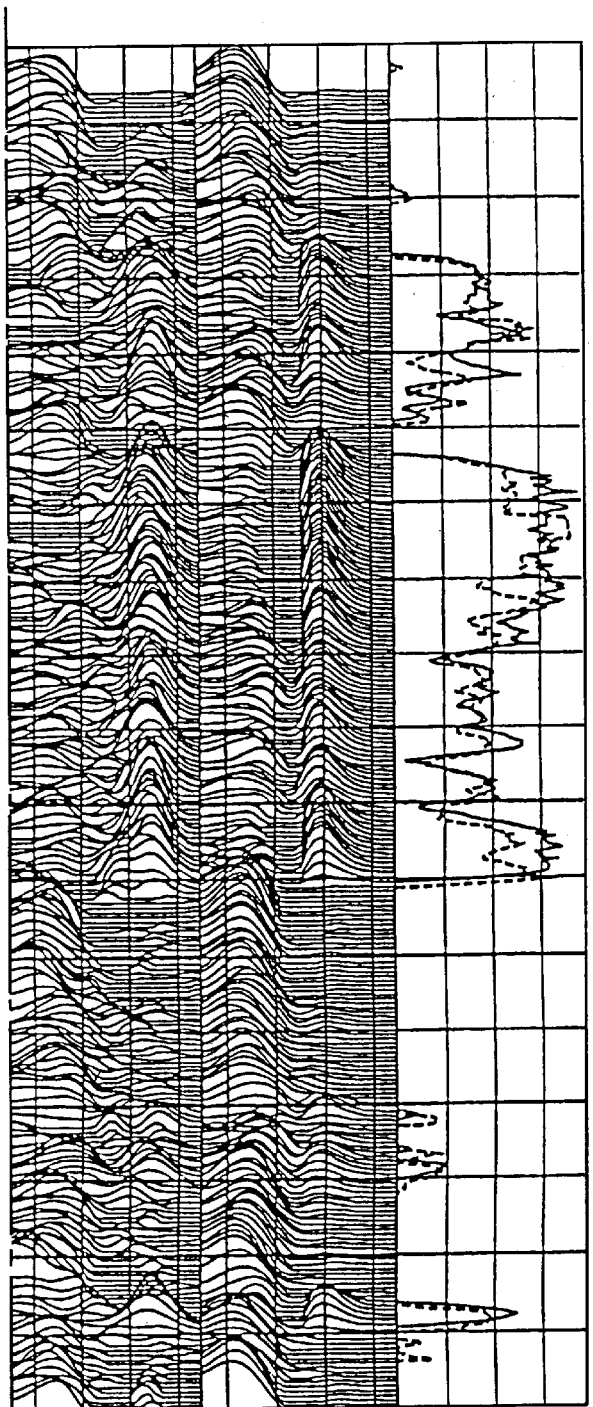

However, $T_1$ remains sensitive to viscosity over the entire range of crudes and mud filtrates, as shown in FIG. 11 of Kleinberg, R. L. Vinegar, H. J., 1996, "NMR Properties of Reservoir Fluids", Log Analyst November–December 1996. pg. 20–32. Thus, $T_1$ can be used to discriminate OBM filtrate from formation oil. The apparent NMR porosity $\phi_{app}$ is the sum of contributions from the fluids in the formation. For true porosity φ and saturations $S_j$ $$\phi_{app} = \sum_j \phi S_j \left[ 1 - \exp\left( -\frac{W}{T_{1j}} \right) \right] \qquad (11)$$

where W is the wait time and $T_{1j}$ is the relaxation time of fluid j. If the wait time is substantially longer than the $T_1$'s of all fluids, $\phi_{app}$=φ, so the magnetic resonance signal amplitude will be unchanged as the tool crosses the OWC. On the other hand, reduced wait times can result in substantial signal amplitude changes. When combined with other porosity logs, use of a single MR pass will differentiate OBM-invaded water and oil zones.

Figure 7:
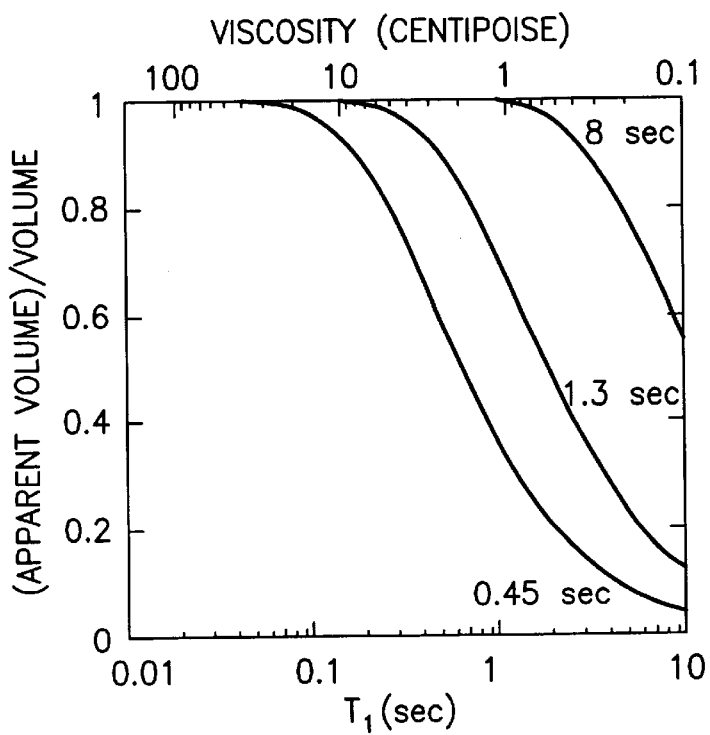
FIG. 7 shows NMR fluid volume (normalized by true volume) versus $T_1$ for three values of wait time W.

FIG. 7 illustrates a basis of the technique. The factor in square brackets in Equation (11) is plotted versus $T_1$ for three wait times: 8 sec, 1.3 sec, and 0.45 sec. Even 8 sec is not adequate to fully polarize fluids with $T_{1>2}$ sec, which includes many OBM filtrates and light oils. Using any of the three wait times will produce amplitude contrast between fluids of differing $T_1$. While W=0.45 sec is shorter than optimal for the OWC application, this aggressively reduced wait time permits faster logging, improved vertical resolution and/or increased data stacking over the entire logged section while yielding good amplitude contrast at the OWC.

Figure 8A:
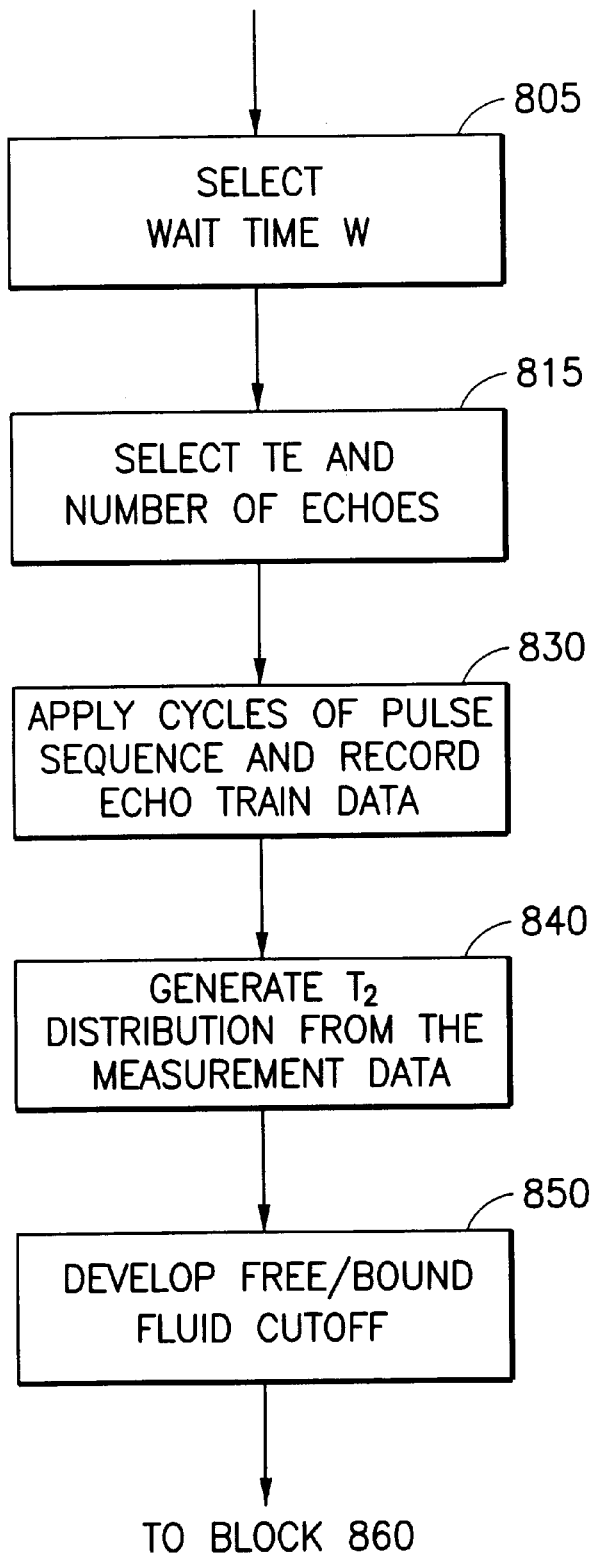
FIG. 8, which includes FIGS. 8A and 8B placed one below another, is a flow diagram of a routine for controlling a processor subsystem in accordance with an embodiment of the invention.
Figure 8B:
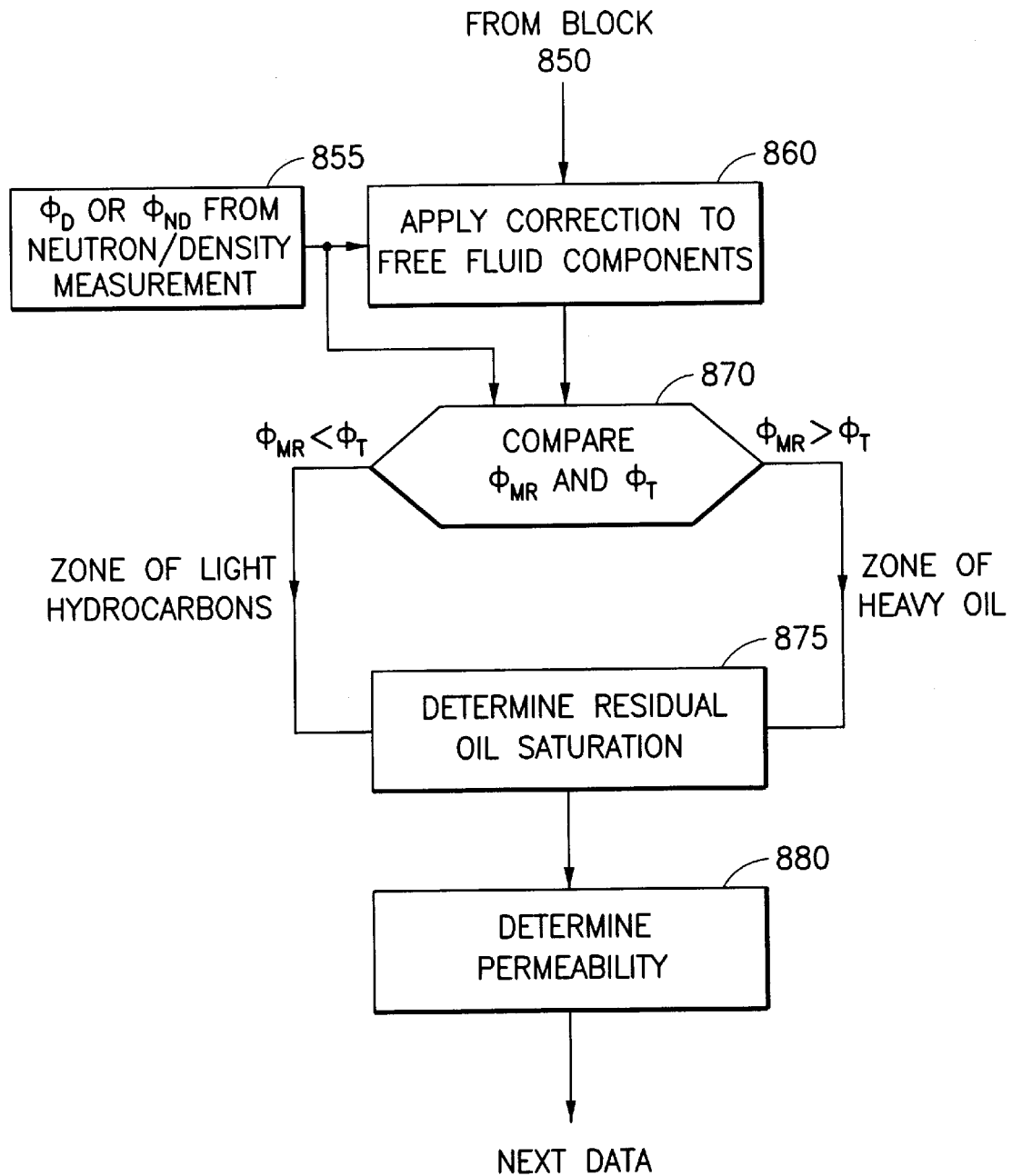

Referring to FIG. 8, there is shown a flow diagram of a routine for controlling a processor in accordance with an embodiment of the invention. The processor can be a downhole processor, the uphole processor in equipment 7 (FIG. 1), or a remote processor which operates subsequently on stored and/or transmitted log-representative signals, as well as combinations of downhole, uphole, and remote processors. In the flow diagram of FIG. 8, the block 805 represents selecting of the wait time W. The wait time will be relatively short for incomplete polarization. The preferred range of W is 0.1 to 1 second. Next, as represented by the block 815, the echo spacing, TE, and the number of echoes are selected for the pulse sequence. The pulse sequence is then applied and the resultant echo train is recorded. It will be understood that any suitable technique can be used for applying the pulse sequence, a CPMG pulse sequence being used for the present embodiment. A $T_2$ distribution is then generated from the echo train data, as represented by the block 840, and a standard free/bound fluid cutoff is developed, as represented by the block 850. Reference can be made, for example, to Straley, C., Rossini, D., Vinegar, H., Tutunjian, P., Morriss, C., 1997, "Core Analysis by Low Field NMR", Log Analyst, March–April 1997, pg. 84–94. The block 860 represents application of correction to the free fluid components of the $T_2$ distribution, which are affected by the incomplete polarization, as previously described. In the present embodiment, the correction is in accordance with Equation (6). The density (or neutron-density) porosity, such as measured by device 60 (FIG. 1) is indicated as being available (block 1055), and can be utilized in a water zone to select the correction such that corrected MR porosity will match the total porosity $\phi_T$ in the water zone flushed with oil base mud filtrate. The decision block 870 represents the comparison of the magnetic resonance porosity with the total porosity in an oil bearing zone. In a zone of light hydrocarbons, the MR porosity will be less than the neutron-density derived total porosity (since the applied correction will be too small), whereas in a zone of heavy oil the MR porosity will be greater than the neutron-density derived total porosity (since the applied correction will be too large). The block 875 represents the determination of residual oil saturation, which can be implemented e.g. by quantification of the comparison. Reference can be made to equation (A-10) below and the derivation thereof. The block 880 represents determination of permeability, e.g. by using Equation (9).

Figure 9:
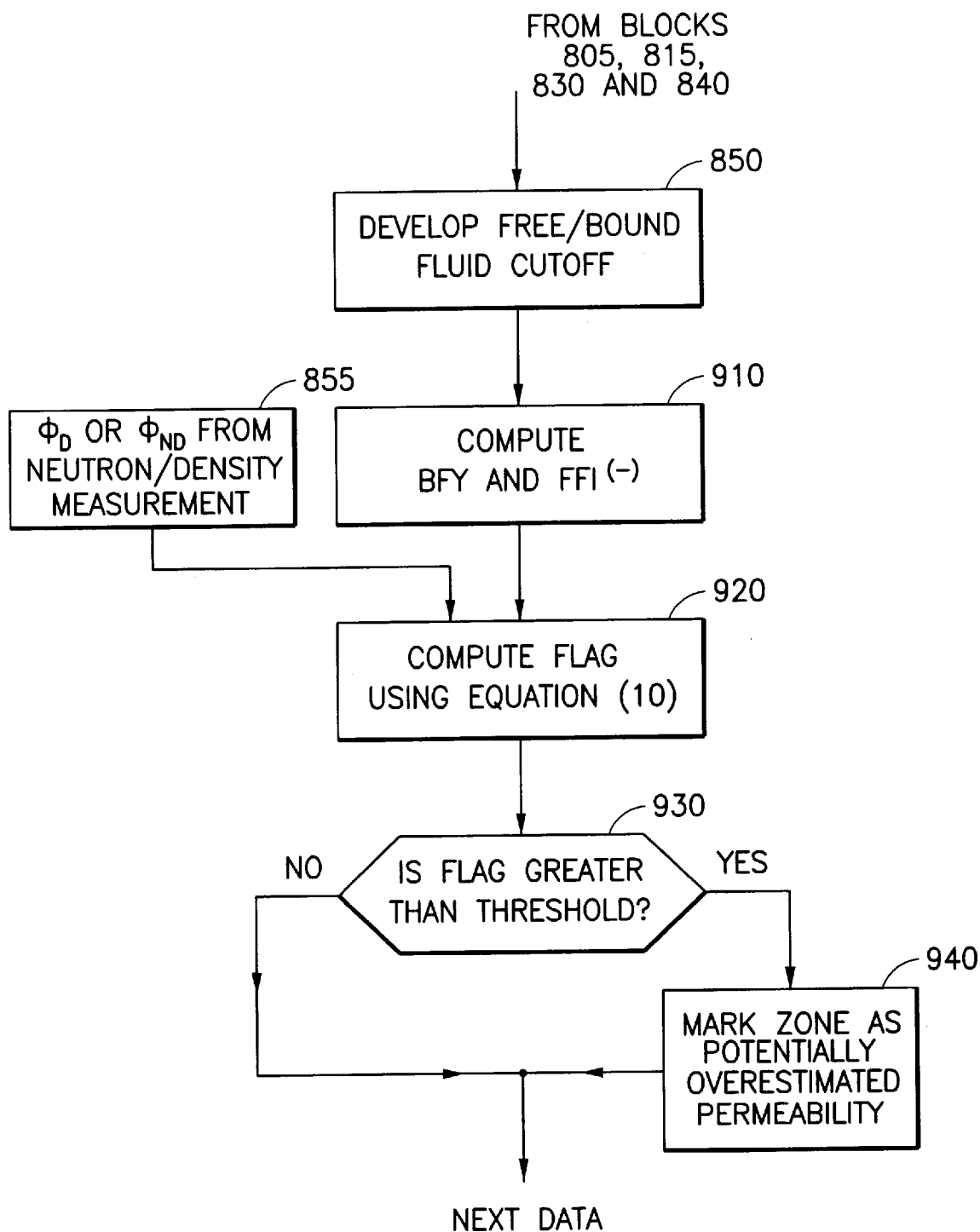
FIG. 9 is a flow diagram of a routine for controlling a processor subsystem in accordance with another embodiment of the invention.

FIG. 9 is a flow diagram of a routine for programming a processor in accordance with an embodiment of the invention for producing and using the Flag for determining potentially overestimated permeability in certain formations wherein at least some of the bound water is not "seen" by the MR logging technique. Again, the processor can be a downhole, uphole, or remote processor. The blocks 805 through 850 (only block 850 being shown in FIG. 9) can correspond to their counterparts in the flow diagram of FIG. 8, with a short wait time again being used. After the free/bound fluid cutoff is developed (block 850), the volumes of bound fluid (BFV) and free fluid ($FFI^{(-)}$, which, as noted above, is the uncorrected and possibly underestimated volume of free fluid) are computed from the respective components of the $T_2$ distribution (block 910). Using the computed values, and the porosity from block 855, the Flag can be computed (block 920). Determination is then made (decision block 930) as to whether the Flag is above a predetermined threshold. If so, the zone can be marked as one of potentially overestimated permeability (block 940).

Log Example #1

In examples hereof, reduced cycle time logging is employed. The reservoirs of the examples were drilled with oil base mud and logged using an MR logging tool of the type described herein (and designated as the "CMR", which is a mark of Schlumberger) and other logging devices as in FIG. 1. [Regarding the CMR tool and processing, reference can be made to U.S. Pat. Nos. 5,055,787 and 5,291,137 and to Freedman, R., Morriss, C. E., 1995, "Processing of Data from an NMR Logging Tool", Society of Petroleum Engineers Paper 30560".] Log Example #1 was a well in the Andrew field in the North Sea. A logging objective was to acquire data at high speed and with enhanced vertical resolution. Neutron, density, resistivity and gamma ray logs were also run. Using the CMR tool to find yet another porosity measure is inefficient because formation oil and oil base mud filtrate both have long $T_1$, so very slow logging would have been required. Even so, detailed log analysis shows that comparing reduced-cycle-time CMR apparent porosity to neutron-density porosity allows precise determination of the residual oil contact. The CMR logging device and pulse sequence parameters were (with SI being sampling interval):

| Pass | Echoes | TE (msec) | Wait (sec) | Speed (ft/hr) | SI (in) |
| --- | --- | --- | --- | --- | --- |
| Fast | 600 | 0.32 | 0.45 | 930 | 4 |

Figure 10A:
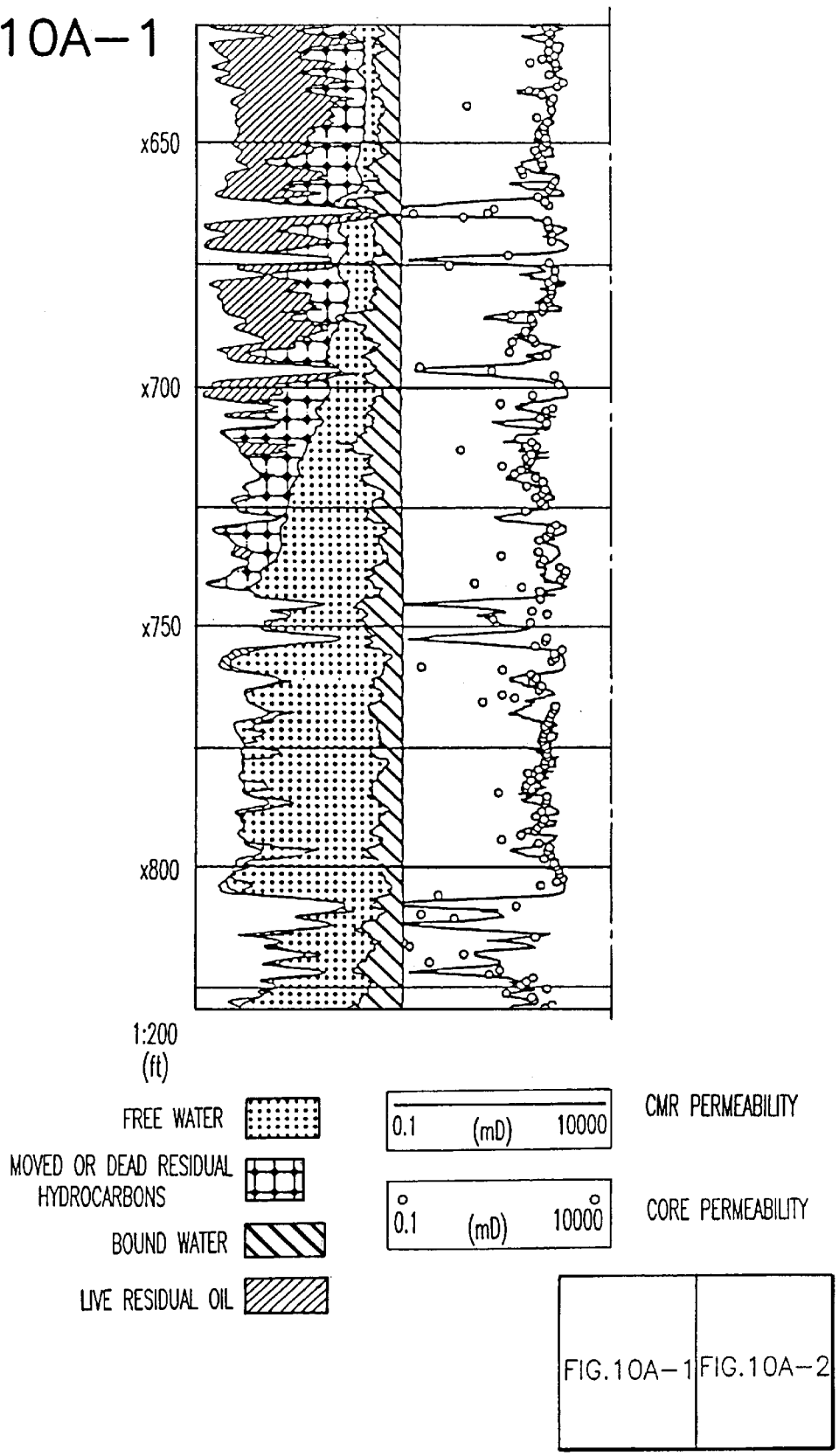
FIG. 10 which includes FIGS. 10A and 10B placed one below another, shows logging tracks and computed tracks for a first log example.

The porosity analysis is as follows: The porosity logs are shown in FIGS. 10A and 10B, track 3. Density and neutron tools were used to determine porosity assuming a sandstone matrix and a fluid density of 0.9 g/cc. Log porosity is $$\phi = \min(\phi_D, 0.7\phi_D + 0.3\phi_N) \qquad (12)$$

The second term comes into play only in the presence of gas, where $\phi_D < \phi_N$. This porosity is in excellent agreement with core measurements, shown as dots. Water volume, $\phi S_W$ is derived from deep resistivity (90 inch array). $R_W = 0.07$ Ω-m was selected so that resistivity-derived porosity matched crossplot porosity in the water leg below x760 feet:

$$\phi S_W = \sqrt{\frac{R_W}{R_T}} \qquad (13)$$

Porosity derived from the CMR tool is also shown, as is the $T_2$ distribution from 0.3 msec to 3000 msec. The wait time of 0.45 sec was insufficient to fully polarize the native oil or oil base mud filtrate. Therefore the standard polarization correction was turned off and a fixed value of $T_1 = 2.5$ sec was used in a custom polarization correction using Equation (6). This correction was applied only to the free fluid part of the signal. The value of $T_1$ was picked so that the corrected CMR porosity matched the density porosity in the water leg (flushed with oil base mud filtrate) below x760. The excellent correlation can be noted.

The bound fluid volume, BFV, is shown in Track 3. The formation is a very clean sand, in which there is little bound water. The $T_{2cutoff} = 100$ msec was selected so that BFV matched $\phi S_W$ high in the hydrocarbon zone. The one parameter fit of CMR data yields excellent curve-character agreement with irreducible water volume determined by resistivity above the transition zone, FIG. 10, Track 3. A conventional sharp cutoff was used. The use of a tapered cutoff [see Coates, G. R., Marschall, D., Mardon, D., Galford, J., 1997, "A New Characterization of Bulk Volume Irreducible Using Magnetic Resonance", SPWLA 38th Annual Logging Symposium, Paper QQ; Kleinberg, R. L., Boyd, A., 1997, "Tapered Cutoffs for Magnetic Resonance Bound Water Volume", Society of Petroleum Engineers Paper 38737] would not be appropriate here, because most of the CMR signal is from the non-wetting phase (oil and oil base mud filtrate) and therefore is not reflective of the pore size distribution of the rock.

Figures 2, 10A:
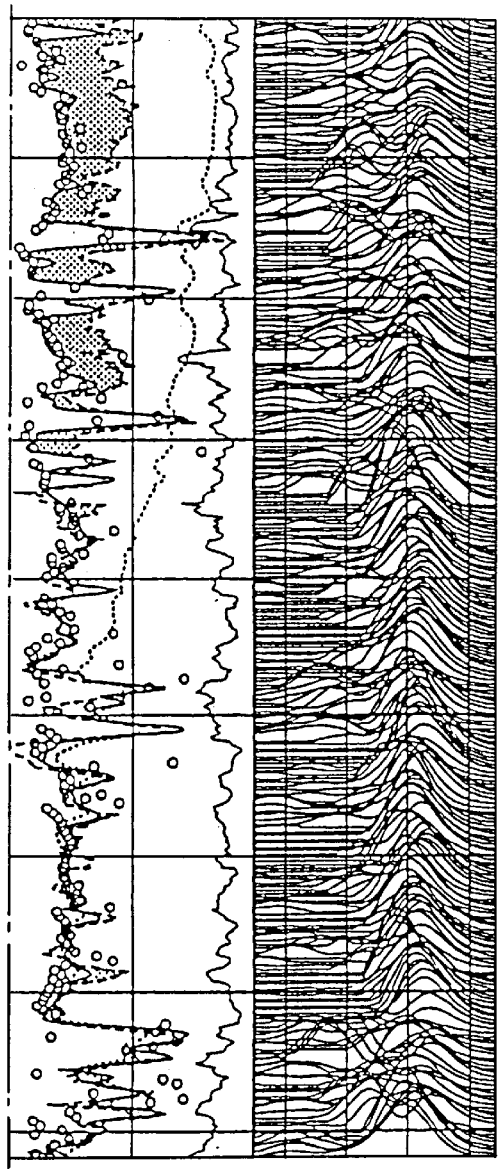
Figures 1, 10B:
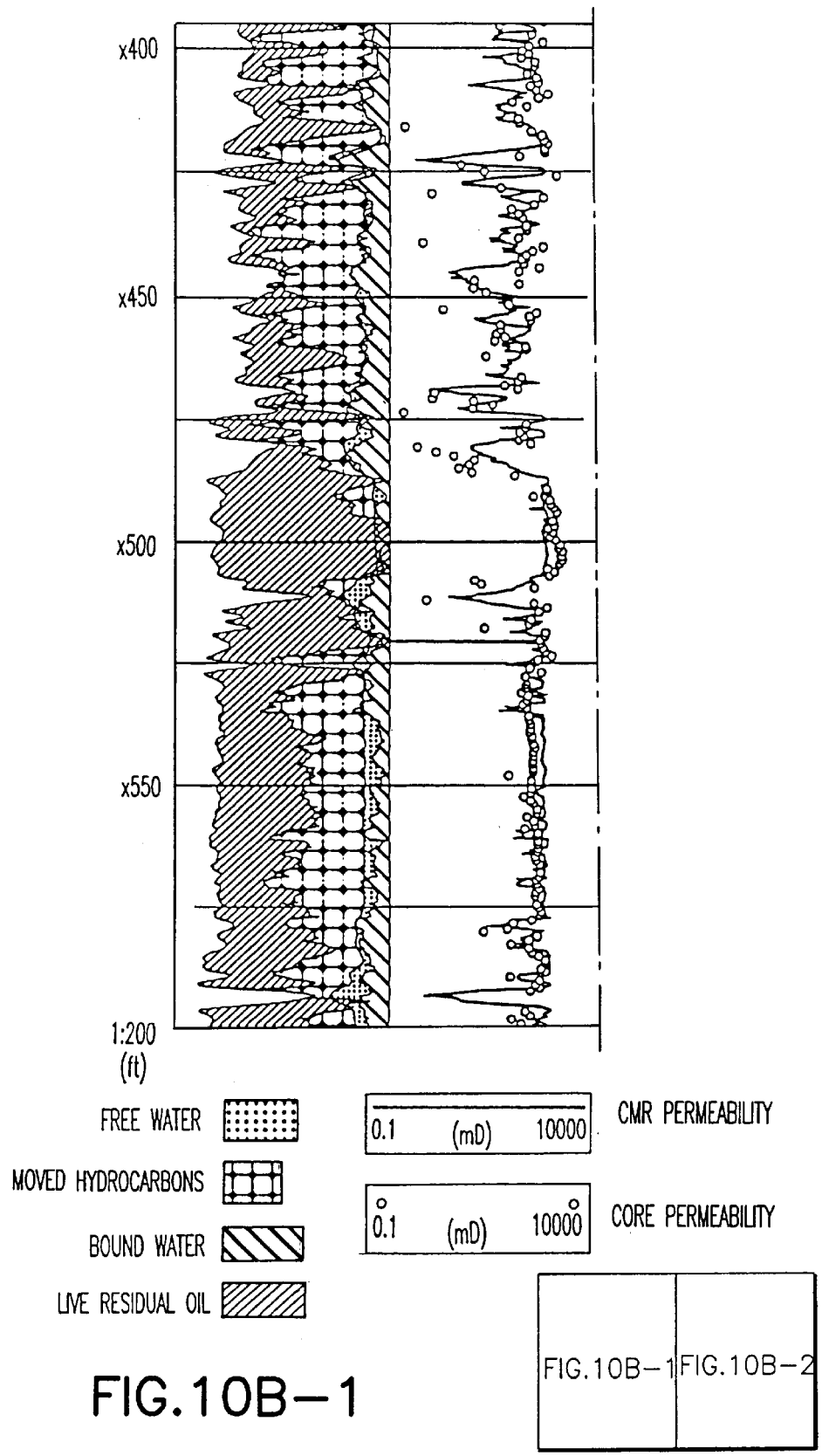

In the hydrocarbon analysis, the CMR log, combined with other logs, reveals five distinct zones (FIG. 10). (1) Below x760 the sand is water saturated; oil base mud filtrate has displaced water in the CMR tool volume of investigation. (2) The original ("paleo") oil-water contact is marked by heavy oil bands at x760 and x750. (3) A layer of dead residual oil, remaining after partial depletion of the reservoir, is found between x740 and x705. (4) Live crude (mixed with OBM filtrate in the flushed zone) is found between x705 and x530. (5) Gas mixed with OBM filtrate is found above x530.

In the water sand, the free fluid is oil base mud filtrate which has displaced movable connate water. OBM filtrates are often alkanes of moderate chain length (e.g. hexadecane, C16), and lack dissolved gas. As explained above, porosity from the CMR tool matches nuclear porosity in this interval when $T_1$=2.5 sec is used in the polarization correction.

When formation crude has a viscosity greater than OBM filtrate, the polarization correction used to match CMR porosity to nuclear porosity below the oil-water contact will be too large. The overcorrection will make CMR porosity larger than nuclear porosity. This is observed in streaks at x760 and x750, where polarization corrected CMR porosity (dashed line) is higher than nuclear porosity (heavy solid line). The presence of heavy oil is sometimes associated with the original oil-water contact in North Sea reservoirs, and is confirmed by the operator in this example.

Above the paleo OWC, from x740 to x705, is a depleted zone in which formation oil has been stripped of gas and light ends. The dead oil here, mixed with mud filtrate, appears to have magnetic resonance properties similar to those of the unmixed filtrate below x760. The polarization correction using $T_1$=2.5 sec again perfectly matches CMR porosity to nuclear and core porosities.

CMR porosity departs from the other porosity measurements above x705 feet. This is interpreted as the depth at which there is the first appearance of live oil in the CMR volume of investigation. This is the native formation oil, composed of short chain alkanes, and having a significant amount of dissolved gas. Its viscosity at reservoir conditions is 0.29 cP. The low viscosity of live formation crude means its relaxation time is significantly longer than that of dead crude and OBM filtrate. When live native oil is present, $T_1$=2.5 sec is no longer large enough to provide an adequate polarization correction, and CMR porosity is too low.

Resistivity shows a very long transition zone spanning more than 80 feet, a consequence of the rock fabric: small pore throats trap formation water at high capillary pressure. However, because there is no capillary pressure difference between OBM filtrate, dead oil, and live oil, the current fluid contact detected by CMR at x705 is sharp. Volumetric analysis is shown in Track 1. Total hydrocarbon saturation is determined by deep resistivity. The live oil volume is found from CMR data; the method by which it is determined being set forth in the Appendix below.

Neutron-density crossover indicates gas above x530. Native gas has mixed with the dead OBM filtrate, producing a mixture with a reduced viscosity and therefore long $T_1$. This effect can be helpful in finding gas-oil contacts, but hydrogen index effects and variability in the degree of mixing make it difficult to quantitatively estimate volumes.

Permeability was estimated by $$k = \min\left(2 \times 10^3 \text{mD}\phi^4\left(\frac{\phi - BFV}{BFV}\right)^2, 2 \times 10^4 \text{mD} \frac{\phi^3}{1-\phi^2}\right) \quad (14)$$

where $\phi$ is the Equation (12) porosity and BFV is the CMR bound fluid volume. The first term is the Equation (9) permeability. The second term is a permeability function appropriate for clean sands [see Herron, M. M., 1987, "Estimating the Intrinsic Permeability of Clastic Sediments from Geochemical Data", SPWLA 28th Annual Logging Symposium, Paper HH]. The permeability was set to 0.01 mD whenever the permeability flag of Equation (10) exceeded 4 with $\epsilon$=0.25 p.u. Agreement with core permeability is good, within the limitations of depth matching and resolution (FIG. 10, Track 2).

Log Example #2

Reduced wait time MR logging was used in a second field on the UK continental shelf to enhance logging speed and measurement precision. Oil base mud was used to drill into a shaly sand light oil reservoir. Conventional porosity tools were used for porosity and lithology determination, as above. Porosity was computed as for Log Example #1, using a fluid density of 0.8 g/cc, appropriate for the oil base mud filtrate in this well. CMR logging obtained measurements of bound water and permeability. The formation of interest was logged with two passes of the CMR. Logging and pulse sequence parameters were (with S=PAP's stacked per 6 inch depth frame)

| Pass | Echoes | TE (msec) | Wait (sec) | Speed (ft/hr) | S |
| --- | --- | --- | --- | --- | --- |
| Slow | 1800 | 0.32 | 4 | 200 | 1 |
| Fast | 300 | 0.32 | 0.25 | 600 | 4 |

The first pass was designed to obtain a full suite of MR measurements, including porosity and free fluid porosity. The second pass was designed to determine the quality of CMR logs acquired at higher speed, where measurement precision was an important consideration. Porosity and $T_2$ distribution were derived from the CMR tool.

For the slow pass, the standard polarization correction was applied using $T_1/T_2$=3, which is typical for formations invaded with oil base mud filtrates. For the fast pass, less than 0.1 sec of data are collected in each CPMG acquisition. Therefore, the longer $T_2$ components in the $T_2$ distribution cannot be accurately estimated. This leads to errors when the conventional polarization correction method, based on the $T_1/T_2$ ratio, is applied. Therefore $T_1$=0.5 sec was assumed for the mud filtrate, and a fixed $T_1$ correction applied to the free fluid part of the measured porosity. $T_1$ of the bound fluid is much shorter, and no polarization correction is required.

The hydrogen index of the OBM filtrate was determined by obtaining a sample of the base oil used to make up the whole mud. In the shop, the CMR was used to compare the amplitude of the signal from the base oil to an identical volume of the aqueous master calibration solution. The hydrogen index was found to be 0.83, a surprisingly low value. This correction was applied to the free fluid component; the bound fluid is formation water, with HI=1. It was assumed that the neutron tool, which has a significantly deeper depth of investigation, was substantially unaffected by the low HI of the filtrate. The measured mud filtrate density, used for bulk density computation of porosity, was 0.8 g/cc. The logs are shown in FIG. 11.

In the slow pass analysis, a wait time of 4 sec was employed to substantially polarize the oil base mud filtrate which partially displaced the connate free fluid in the flushed zone. 1800 echoes were collected to define the long $T_2$ components associated with OBM filtrates. One phase alternated pair (PAP) was collected in each 6 inch depth frame.

Total CMR porosity matches density porosity. The $T_2$ distribution in the shales (Track 3) is generally well resolved and is centered around 3 msec. Note several permeable streaks, for example at x734 meters, indicated by high amplitude at long $T_2$.

In the sand, x678–x705 meters, CMR shows that reservoir quality varies with depth. Bound fluid volume (BFV), the amplitude below $T_{2\text{-}cutoff}=33$ msec, correlates with gamma ray, which has been plotted on a scale of 30 to 110 API units to emphasize the similarity of the curves (Track 1). The correlation coefficient (from the MatLab function "corrcoef") is 0.80 over the entire section shown.

In the fast pass analysis the goals were to achieve both better precision in bound fluid volume and enhanced logging speed. A 0.25 sec wait time and acquisition of only 300 echoes permitted a logging speed of 600 ft/hr, with four phase alternated pairs stacked per 6 inch depth frame. Thus, the effective signal to noise ratio was doubled while the logging speed was improved by a factor of three, compared to the conventional pass.

In the shales, the fast pass results correlate well with those of the slow pass; free fluid near zero, CMR total porosity in excellent agreement with density porosity, and good correlation between bound fluid volume and gamma ray. The $T_2$ distributions for the two runs are similar below 33 msec; the fast pass results (Track 4) are more stable due to superior signal to noise ratio.

In the sands, the fast pass suppressed long relaxation time components and moved them to somewhat shorter $T_2$, but the use of a polarization correction ($T_1=0.5$ sec) restored free and total CMR porosity (Tracks 2 and 4). The correction is large and distorts the $T_2$ distribution, but excellent agreement between fast and slow pass porosity demonstrates that the polarization correction is accurate, and that no long-$T_1$ components are unaccounted for.

As expected, the fast pass improved the definition of the bound fluid in the $T_2$ distributions. The improved signal to noise ratio of the fast pass manifests itself in visibly improved correlation between BFV and gamma ray. This conclusion is supported by statistical examination. The correlation coefficient is 0.91.

Log permeabilities were computed using $$k = \min\left[10^4 \text{mD}\phi^4\left(\frac{\phi - BFV}{BFV}\right)^2, 10^5 \text{mD}\frac{\phi^3}{1-\phi^2}\right] \quad (15)$$

The porosity used was the density porosity. Differences between the fast and slow pass reflect differences in BFV. Therefore, it is believed that fast pass permeability results are more precise than slow pass results.

Appendix

Residual oil saturation in Well #1 was determined by comparing the partially polarization-corrected CMR porosity to total porosity determined from density and neutron tools. The wait time W=0.45 sec. At the CMR depth of investigation, the water leg is saturated with irreducible water, oil base mud filtrate, and dead residual oil. The irreducible water has very short $T_1$, and no polarization correction was applied to it. The $T_1$'s of the OBM filtrate and dead crude were assumed equal and were determined by applying the polarization correction, Equation (6), to the free fluid to match CMR porosity to nuclear porosity in the water leg; a value of $T_{1dead}=2.5$ sec was found.

The oil leg contains irreducible water, oil base mud filtrate, and live native hydrocarbon. This mixture, which is rich in gas and has a viscosity at reservoir conditions of $\eta=0.29$ cP, Longitudinal relaxation time is estimated by $$T_1 = \frac{(1.2 \text{ sec. cP})}{\eta} \frac{[T(°C) + 273]}{298} \quad (A-1)$$

giving approximately $T_{1live}=6$ sec at reservoir temperature.

| Fluid | Volume | $T_1$ (sec) |
|---|---|---|
| Irreducible water | $V_W$ | <<0.45 |
| Filtrate + Dead Residual | $V_{dead}$ | $T_{1dead} = 2.5$ |
| Live Oil | $V_{live}$ | $T_{1live} = 6$ |

The uncorrected CMR signal is $$CMR_{uncor} = V_W + V_{dead}\left[1 - \exp\left(-\frac{W}{T_{1,dead}}\right)\right] + V_{live}\left[1 - \exp\left(-\frac{W}{T_{1,live}}\right)\right] \quad (A-2)$$

For wait time W=0.45 sec, and $T_1$ for mud filtrate and oil as given in the table, $$CMR_{uncor} = V_W + 0.165 V_{dead} + 0.0723 V_{live} \quad (A-3)$$

The polarization corrected CMR signal is $$CMR_{cor} = BFV + \frac{FFI^{(-)}}{[1 - \exp(-W/T_1)]} \quad (A-4)$$

where $FFI^{(-)}$ is the apparent free fluid volume, which is less than its true value due to insufficient wait time. Assuming the bound fluid volume and the water volume are the same, the free fluid is corrected by the mud filtrate polarization correction $$CMR_{cor} = V_W + \frac{(CMR_{uncor} - V_W)}{[1 - \exp(-W/T_{1,dead})]} \quad (A-5)$$

Combining Equations (A-3) and (A-5), $$CMR_{cor} = V_W + V_{dead} + 0.438 V_{live} \quad (A-6)$$

The nuclear porosity is $$\phi_T = V_W + V_{dead} + V_{live} \quad (A-7)$$

So the porosity deficit is $$\phi_T - CMR_{cor} = 0.562 \, V_{live} \quad (A-8)$$

Solving (A-8) for the volume of live oil $$V_{live} = 1.78 \, (\phi_T - CMR_{cor}) \quad (A-9)$$

This is plotted in Track 1 of FIGS. 8.

What is claimed is:

1. A method for determining residual oil saturation in formations surrounding an earth borehole, comprising the steps of:
   providing a nuclear magnetic resonance logging device that is moveable through the borehole;
   providing, from said logging device, a polarizing magnetic field and cycles of a magnetic pulse sequence, and receiving magnetic resonance spin echoes from the formations, the polarization wait time, W, of said cycles of magnetic pulse sequence being short enough to incompletely polarize the protons in an investigation region of the formations;

processing the received spin echoes to obtain a magnetic resonance porosity;

deriving a measure of total porosity of said formations; and determining residual oil saturation from said magnetic resonance porosity and said total porosity.

2. The method as defined by claim 1, wherein said wait time, W, is in the range 0.1 second to 1 second.

3. The method as defined by claim 1, wherein said step of deriving a measure of total porosity comprises deriving a density and/or neutron porosity measurement in said investigation region of the formations.

4. The method as defined by claim 1, further comprising applying a polarization correction to said magnetic resonance porosity from said $T_2$ distribution.

5. The method as defined by claim 1, wherein said step of processing the received spin echoes to obtain a magnetic resonance porosity includes processing the received spin echoes to produce a $T_2$ distribution, and computing said magnetic resonance porosity from said $T_2$ distribution.

6. The method as defined by claim 5, further comprising applying a polarization correction to the free fluid components of said $T_2$ distribution before computing said magnetic resonance porosity from said $T_2$ distribution.

7. The method as defined by claim 6, wherein said polarization correction is of the form $$P(T_{2i}) = \frac{(P(T_{2i}))_{uncorr}}{1 - \exp\left(-\frac{W}{T_1}\right)}$$

where $P(T_{2i})$ is the corrected $T_2$ distribution, $P(T_{2i})_{uncorr}$ is the uncorrected $T_2$ distribution, and $T_1$ is a selected longitudinal relaxation time of the free fluid.

8. The method as defined by claim 5, further comprising the steps of developing a free/bound fluid cutoff of said $T_2$ distribution and applying a polarization correction to the free fluid components of said $T_2$ distribution before computing said magnetic resonance porosity from said $T_2$ distribution, and wherein said step of determining residual oil saturation from said magnetic resonance porosity and said total porosity comprises comparing said respective porosities in a water-bearing zone of said formations and comparing said respective porosities in an oil-bearing zone of said formations.

9. A method for determining an indication that a formation surrounding an earth borehole has a potentially overestimated permeability, comprising the steps of:

providing a nuclear magnetic resonance logging device that is moveable through the borehole;

providing, from said logging device, a polarizing magnetic field and cycles of a magnetic pulse sequence, and receiving magnetic resonance spin echoes from the formations, the polarization wait time, W, of said cycles of magnetic pulse sequence being short enough to incompletely polarize the protons in an investigation region of the formations;

processing the received spin echoes and deriving a bound fluid volume, BFV, and a free fluid volume $FFI^{(-)}$ from said received spin echoes;

deriving a measure of total porosity $\phi$ of said formations; and deriving a flag indicative of potentially overestimated permeability from said BRV, $FFI^{(-)}$, and $\phi$.

10. The method as defined by claim 9, wherein said flag is derived as $$\text{Flag} = \frac{\phi_D - BFV}{FFI^{(-)} + \varepsilon}.$$

11. The method as defined by claim 9, wherein said wait time, W, is in the range 0.1 second to 1 second.

12. The method as defined by claim 9, wherein said step of deriving a measure of total porosity comprises deriving a density and/or neutron porosity measurement in said investigation region of the formations.

13. Apparatus for identifying characteristics of hydrocarbons in formations surrounding an earth borehole, comprising:

a nuclear magnetic resonance logging device that is moveable through the borehole;

means, in said logging device, for providing a polarizing magnetic field and cycles of a magnetic pulse sequence, and for receiving magnetic resonance spin echoes from the formations;

means for processing the received spin echoes to obtain a magnetic resonance porosity;

means for deriving a measure of total porosity of said formations; and means for comparing said magnetic resonance porosity with said total porosity, said comparing means comprising means for comparing said respective porosities in a water-bearing zone of said formations and for comparing said respective porosities in an oil-bearing zone of said formations.

14. Apparatus as defined by claim 13, wherein said means for providing a polarizing magnetic field and cycles of a magnetic pulse sequence is operative to provide a polarization wait time, W, of said cycles of magnetic pulse sequence that is short enough to incompletely polarize the protons in an investigation region of the formations.

15. Apparatus as defined by 14, further comprising means for determining the residual oil saturation of said formations from the output of said comparing means.

16. Apparatus for determining residual oil saturation in formations surrounding an earth borehole, comprising:

a nuclear magnetic resonance logging device that is moveable through the borehole;

means, in from said logging device, for providing a polarizing magnetic field and cycles of a magnetic pulse sequence, and for receiving magnetic resonance spin echoes from the formations, the polarization wait time, W, of said cycles of magnetic pulse sequence being short enough to incompletely polarize the protons in an investigation region of the formations;

means for processing the received spin echoes to obtain a magnetic resonance porosity;

means for deriving a measure of total porosity of said formations; and means for determining residual oil saturation from said magnetic resonance porosity and said total porosity.

17. A method for identifying characteristics of hydrocarbons in formations surrounding an earth borehole, comprising the steps of:

providing a nuclear magnetic resonance logging device that is moveable through the borehole;

providing, from said logging device, a polarizing magnetic field and cycles of a magnetic pulse sequence, and receiving magnetic resonance spin echoes from the formations, the polarization wait time, W, of said cycles of magnetic pulse sequence being short enough to incompletely polarize the protons in an investigation region of the formations;

processing the received spin echoes to obtain a magnetic resonance porosity;

deriving a measure of total porosity of said formations from a density and/or neutron porosity measurement in said investigation region of the formations; and comparing said magnetic resonance porosity with said total porosity.

18. The method as defined by claim 17, wherein said wait time, W, is in the range 0.1 second to 1 second.

19. A method for identifying characteristics of hydrocarbons in formations surrounding an earth borehole, comprising the steps of:

providing a nuclear magnetic resonance logging device that is moveable through the borehole;

providing, from said logging device, a polarizing magnetic field and cycles of a magnetic pulse sequence, and receiving magnetic resonance spin echoes from the formations;

processing the received spin echoes to obtain a magnetic resonance porosity;

deriving a measure of total porosity of said formations; and comparing said magnetic resonance porosity with said total porosity, said comparing step comprising comparing said respective porosities in a water-bearing zone of said formations and comparing said respective porosities in an oil-bearing zone of said formations.

20. The method as defined by claim 19, wherein the polarization wait time, W, of said cycles of magnetic pulse sequence is short enough to incompletely polarize the protons in an investigation region of the formations.

21. The method as defined by claim 20, wherein said wait time, W, is in the range 0.1 second to 1 second.

22. A method for identifying characteristics of hydrocarbons in formations surrounding an earth borehole, comprising the steps of:

providing a nuclear magnetic resonance logging device that is moveable through the borehole;

providing, from said logging device, a polarizing magnetic field and cycles of a magnetic pulse sequence, and receiving magnetic resonance spin echoes from the formations, the polarization wait time, W, of said cycles of magnetic pulse sequence being short enough to incompletely polarize the protons in an investigation region of the formations;

processing the received spin echoes to obtain a magnetic resonance porosity by processing the received spin echoes to produce a $T_2$ distribution, applying a polarization correction to the free fluid components of said $T_2$ distribution, said polarization correction being of the form $$P(T_{2i}) = \frac{(P(T_{2i}))_{uncorr}}{1 - \exp\left(-\frac{W}{T_1}\right)}$$

where $P(T_{2i})$ is the corrected $T_2$ distribution, $P(T_{2i})_{uncorr}$ is the uncorrected $T_2$ distribution, and $T_1$ is a selected longitudinal relaxation time of the free fluid, and computing said magnetic resonance porosity from said polarization corrected $T_2$ distribution;

deriving a measure of total porosity of said formations; and comparing said magnetic resonance porosity with said total porosity.

23. A method for identifying characteristics of hydrocarbons in formations surrounding an earth borehole, comprising the steps of:

providing a nuclear magnetic resonance logging device that is moveable through the borehole;

providing, from said logging device, a polarizing magnetic field and cycles of a magnetic pulse sequence, and receiving magnetic resonance spin echoes from the formations, the polarization wait time, W, of said cycles of magnetic pulse sequence being short enough to incompletely polarize the protons in an investigation region of the formations;

processing the received spin echoes to obtain a magnetic resonance porosity by processing the received spin echoes to produce a $T_2$ distribution, developing a free/bound fluid cutoff of said $T_2$ distribution, applying a polarization correction to the free fluid components of said $T_2$ distribution, and computing said magnetic resonance porosity from said $T_2$ distribution;

deriving a measure of total porosity of said formations; and comparing said magnetic resonance porosity with said total porosity, said comparing step comprising comparing said respective porosities in a water-bearing zone of said formations and comparing said respective porosities in an oil-bearing zone of said formations.

24. The method as defined by claim 23, wherein said earth borehole was drilled with oil base mud, and wherein said step of comparing said magnetic resonance porosity with said total porosity comprises comparing said respective porosities in a water-bearing zone of said formations that has been flushed with oil base mud filtrate and comparing said respective porosities in an oil-bearing zone of said formations.

25. The method as defined by claim 24, further comprising the step of identifying the presence of light oil in said formations when the corrected magnetic resonance porosity is less than the total porosity.

26. The method as defined by claim 24, further comprising the step of identifying the presence of heavy oil in said formations when the corrected magnetic resonance porosity is greater than the total porosity.

27. The method as defined by claim 23, further comprising the step of identifying the presence of light oil in said formations when the corrected magnetic resonance porosity is less than the total porosity.

28. The method as defined by claim 23, further comprising the step of identifying the presence of heavy oil in said formations when the corrected magnetic resonance porosity is greater than the total porosity.

29. A method for identifying characteristics of hydrocarbons in formations surrounding an earth borehole that has been drilled with oil base mud, comprising the steps of:

providing a nuclear magnetic resonance logging device that is moveable through the borehole;

providing, from said logging device, a polarizing magnetic field and cycles of a magnetic pulse sequence, and receiving magnetic resonance spin echoes from the formations;

processing the received spin echoes to obtain a magnetic resonance porosity;

deriving a measure of total porosity of said formations; and comparing said magnetic resonance porosity with said total porosity.

30. The method as defined by claim 29, wherein the polarization wait time, W, of said cycles of magnetic pulse sequence is short enough to incompletely polarize the protons in an investigation region of the formations.

31. The method as defined by claim 29, further comprising the step of computing the residual oil saturation of said formations as a function of said comparison.

32. A method for identifying characteristics of hydrocarbons in formations surrounding an earth borehole, comprising the steps of:

providing a nuclear magnetic resonance logging device that is moveable through the borehole;

providing, from said logging device, a polarizing magnetic field and cycles of a magnetic pulse sequence, and receiving magnetic resonance spin echoes from the formations, the polarization wait time, W, of said cycles of magnetic pulse sequence is short enough to incompletely polarize the protons in an investigation region of the formations;

processing the received spin echoes to obtain a magnetic resonance porosity;

deriving a measure of total porosity of said formations; and comparing said magnetic resonance porosity with said total porosity and computing the residual oil saturation of said formations as a function of said comparison.

* * * * *